(12) United States Patent
Kersten

(10) Patent No.: US 12,488,926 B1
(45) Date of Patent: Dec. 2, 2025

(54) INTEGRAL TRANSFORMER JUNCTION MODULE

(71) Applicant: George W Kersten, Pulaski, WI (US)

(72) Inventor: George W Kersten, Pulaski, WI (US)

( * ) Notice: Subject to any disclaimer, the term of this patent is extended or adjusted under 35 U.S.C. 154(b) by 0 days.

(21) Appl. No.: 18/924,474

(22) Filed: Oct. 23, 2024

(51) Int. Cl.
| | |
|---|---|
| H02G 13/00 | (2006.01) |
| H01F 27/04 | (2006.01) |
| H01F 27/40 | (2006.01) |
| H01F 30/06 | (2006.01) |

(52) U.S. Cl.
CPC ........... *H01F 27/04* (2013.01); *H01F 27/402* (2013.01); *H01F 30/06* (2013.01); *H02G 13/80* (2013.01)

(58) Field of Classification Search
CPC ........ H01F 27/04; H01F 27/402; H01F 30/06; H02G 13/80
USPC ......................................................... 361/724
See application file for complete search history.

(56) References Cited

U.S. PATENT DOCUMENTS

| | | | | |
|---|---|---|---|---|
| 7,286,337 | B2 * | 10/2007 | Masuhara ............ | H02B 11/167 361/620 |
| 2005/0013065 | A1 * | 1/2005 | Kersten ................ | H01F 29/025 361/38 |
| 2016/0261055 | A1 * | 9/2016 | Tremaine .............. | H05K 5/061 |
| 2022/0270840 | A1 * | 8/2022 | Hanna ................... | H01H 83/04 |

* cited by examiner

*Primary Examiner* — Binh B Tran

(57) ABSTRACT

A low voltage cabinet is provided that is separate from but integral with the high voltage side compartment with a layout providing a current-limiting circuit breaker, switched fuse or other means of current interrupting that protects the power section from overload. Provides better low voltage geometry for linemen and protects from overload and lightning.

22 Claims, 9 Drawing Sheets

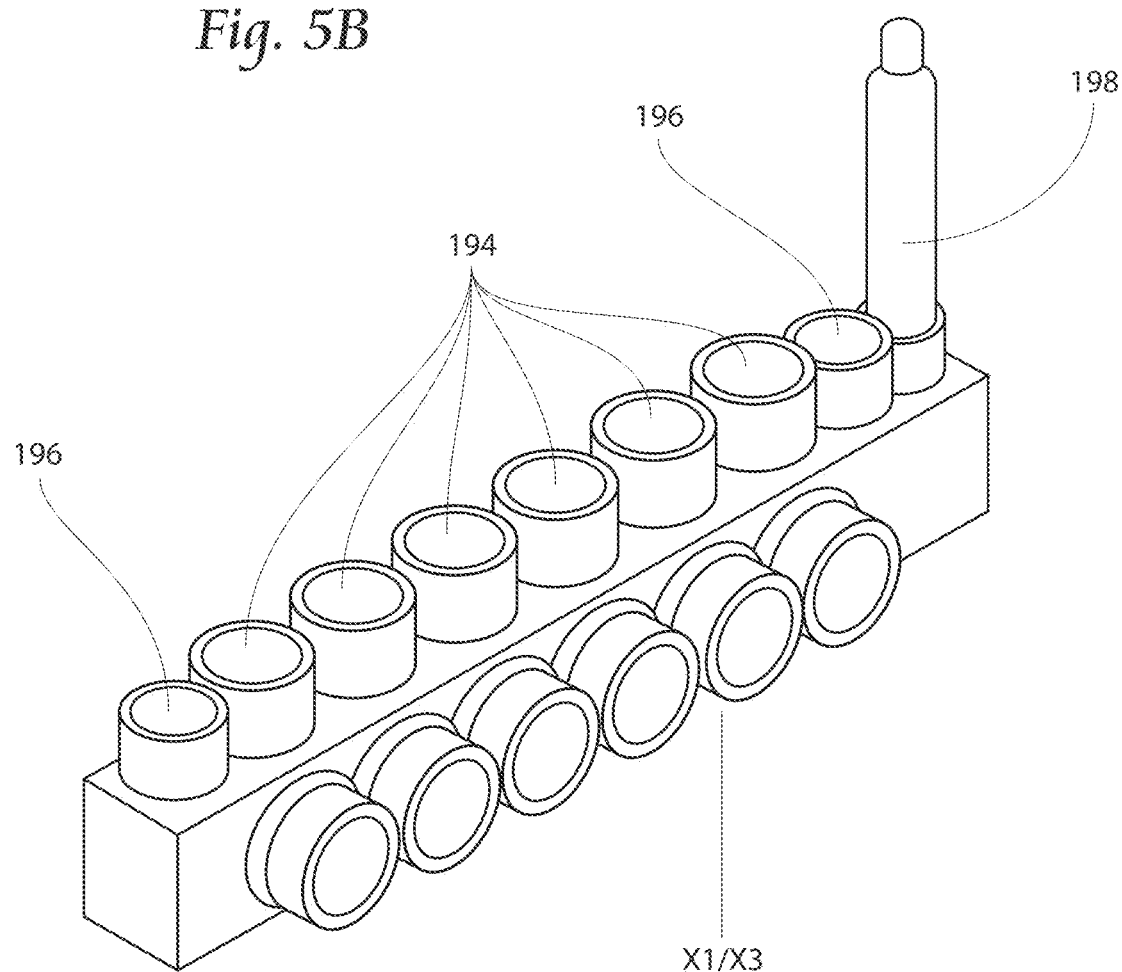

INTEGRAL TRANSFORMER JUNCTION MODULE

BACKGROUND OF THE INVENTION

Supplying secondary power at a junction of an underground electrical distribution system typically requires that a separate transformer be connected to a sectionalizing cabinet/junction box, module or switchgear cabinet. Peripheral cables within the underground distribution system may be connected between the transformers, switchgear, vaults, junction boxes, secondary pedestals and other hardware. In one method of sectionalizing an electrical distribution system and supplying power to a local site simultaneously, cables are connected to a junction module(s) located within a sectionalizing cabinet.

The cables are then redirected from the junction module to the stand-alone transformer, which is typically located within close proximity to the sectionalizing cabinet. As an alternative, a pole mount transformer might be placed inside the sectionalizing cabinet. Whether the transformer is inside or close to the cabinet, the junction module is still connected to the transformer by external cables, cable terminations ("elbows"), and other associated connection hardware. A system that joins both units without external connections is taught in U.S. Pat. No. 7,548,148, incorporated herein by reference.

Prior art configurations, no longer the safest, most efficient or reliable, use discrete products, a sectionalizing box, transformer, and at times a secondary and metered pedestal. These items must be tied together with cables, wires, and multiple connections by extensive trenching. The result is multiple unsightly green utility boxes above ground. Multiple padmount system products in close proximity can result in a great deal of congestion underground creating a potential hazardous work environment for linemen and system integrity. Electric cables (primary and secondary), gas, sewer, water, Internet and cable TV lines are typically nearby, so installations can be time-consuming, costly, and potentially unsafe if lines are not properly located pre-installation.

Both single and three phase transformers are in use today. Traditionally on present day transformers are a high voltage side and secondary side with connections via leads, lugs or bushings. The transformer is for residential, commercial, industrial or other types of loads needing power.

A sectionalizing pedestal or junction box or switchgear is used to sectionalize or split underground cables (power delivery). At a substation, most utility lines exit the substation as 3 phase circuits. The lines exit the substation and are laid underground until the line encounters an intersection needing power or location where the cable needs the neutral wires to be grounded and low voltage power needed there as well. Cables then exit the underground and they are terminated or split in a junction box or switchgear.

SUMMARY OF THE INVENTION

The present invention is a unit which combines the functions of the old discrete items into a safer, easier to use, more efficient, aesthetically pleasing and cost-effective product designed with the line worker in mind. The apparatus of the present invention minimizes or eliminates many of the hazards and risks to personnel and the electric system associated with the old design, such as arc flash, elbows and cables contaminated with oil, falls, trips, spills, bending and twisting, or the unpleasant surprise of finding critters as you lift up the cabinet doors of the prior art.

The transformer is also protected from moisture, lighting, and overloads which are the most common causes of transformer failure. The separate low-voltage compartment is touch safe and laid out to provide a roomier work environment when operating or maintenance is needed. An extended handle on a circuit breaker (or other method such as a vacuum interrupter, fused switch, or the like) allows an operator to open the circuit and de-energize low voltage connection points (e.g., X1, X2, X3 connectors). One additional safety benefit of the handle is that it provides a means of separation between the operator and potential arc flash at the point of current interruption. Preferably LED lights or other methods of illumination indicate voltage at the low voltage connection points), and along with a high impedance test point, provide two convenient means of voltage detection. The LED lights may be in a circuit which is completed only while the door is open, thus saving energy when the doors are closed. An insulated stud can be provided on the potentially energized connection. A window between primary and secondary compartments allows the operators to confirm a good connection to the ground rod in the primary compartment while accessing the secondary compartment. A partial range current limiting fuse on the high voltage side or other method of limiting incoming energy to the power section) combined with the current limiting breaker in the low side, dramatically reduces arc flash, and i2t energy levels.

Up to 80% of all lightning strikes enter transformers from the low-voltage side. The transformer of the present invention is protected with a preferably 140 kVA non-fragmenting arresters, capable of dissipating repetitive lightning strikes without performance degradation. The present invention requires less time, labor and heavy equipment to install than the prior art.

The transformer of the present invention focuses on safety, ease of operation and reliability, and dramatically reduces the risk of arc flash. It also has a safer cabinet design, compartment separation, biodegradable seed based dielectric fluid or other dielectric, arresters, arrester profile, less congested trenching, and a safer layout. It protects utility personnel, pedestrians, and the electric system.

The present invention applies to multiple transformer configurations, including both single, two, and three phase transformers across multiple applications and locations. The three phase unit preferably results in a low profile three phase transformer. A novel secondary compartment layout is disclosed which optionally preferably eliminates the need for an independent meter and/or secondary pedestal.

Integral threaded studs of the power section tank are used to hold the power section (core/coil) of the transformer in place and also retain secondary compartment components/material in place.

In one novel aspect of the present invention, a separate low voltage cabinet is provided that is integral with the high voltage side compartment with a layout providing a current-limiting circuit breaker or a switched fuse between the two sides or other current interrupting means. This external application eliminates the need for an internal fuse in the transformer to protect from transformer overloads and eliminates the need to open a fuse holder which goes into the transformer power section tank/unit, which can expose the transformer internal components to humidity, moisture or other contaminants. This is also often a cause of cable and cable termination (elbow) contamination with dielectric fluids and eventual power interruptions due to material failures from dielectric contamination.

Additionally, protection in the secondary compartment protects the load from the transformer out, and normal operation will protect from the meter pedestal out (best case) or often there is not protection until the wires hit the load, as in a residential fuse box. In such cases, if there is a fault downstream from the transformer, it opens the internal fuse or trips a breaker on the high voltage side of the distribution system.

The secondary compartment comes out of either the side or the back of the unit, and has secondary lugs laid out for safety and ease of access. The secondary cabinet is integral yet may be a completely separate compartment electrically, so there preferably is no more than 600V at any time in the secondary cabinet. The secondary compartment is separate yet it is all part of the transformer system, this is the low voltage portion of the power system The unit is provided with lights (in one embodiment, LED lights) that turn on when the door is open to indicate voltage at the buss work (secondary lugs). When the circuit breaker is opened the lights turn off, and there is an optional high impedance test point which is used to confirm the power at the lugs is out, providing two confirmations of no power. The secondary compartment is protected with a current-limiting circuit breaker or other means of circuit interruption to minimize arc-flash potential.

Alternatives include a three phase sectionalizing cabinet, a three phase transformer (low profile with a larger cabinet and three power sections) or a single phase transformer with a relatively small primary compartment and a secondary compartment. Additionally, the present invention can be used in a vault or fiberglass unit, in which the secondary is not attached to the high voltage side, and connections are made by cables from a remote location allowing for easier access to the low voltage cabinet.

BRIEF DESCRIPTION OF DRAWINGS

FIG. 5B is a close up view of X1 and X3 connectors of FIG. 5;

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
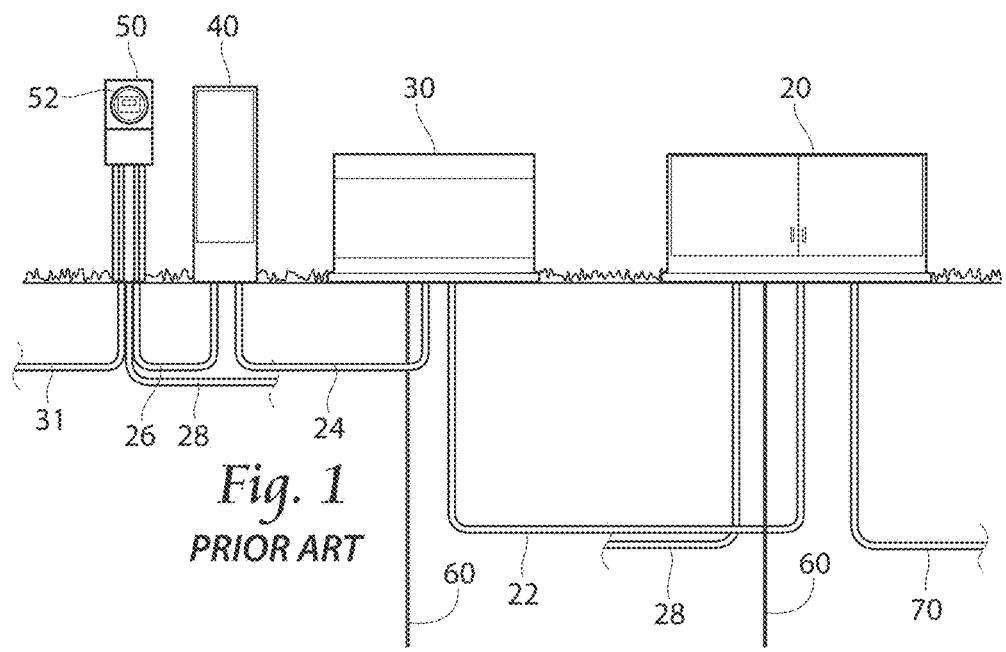
FIG. 1 is a front view of a prior art installation.

Referring now to FIG. 1, a prior art installation is shown. Generally, four separate above-ground compartments or components are generally connected, though a meter addition may also be connected. They are a junction box or sectionalizing cabinet 20, a pad mount transformer 30, a secondary pedestal 40, and a meter 52 mounted on a meter pedestal 50. A line 70 from a power source and line 28 high voltage feeding out to next site requiring high side power (not shown) is fed into the junction box 20. A ground rod 60 extends from the junction box 20, and another ground rod 60 extends from pad mount transformer 30. Line 22 couples in the junction box 20 with a junction modules (not shown) in the junction box 20 to primary bushings (not shown) in the pad mount transformer 30. From a low voltage secondary terminal (not shown) in pad mount transformer 30, a line 24 is coupled to secondary pedestal lugs (not shown) 40. Line 26 couples the secondary pedestal 40 with meter pedestal 50, and line 31 carries power to (the electrical load (house etc.) applications downstream.

Figure 2:
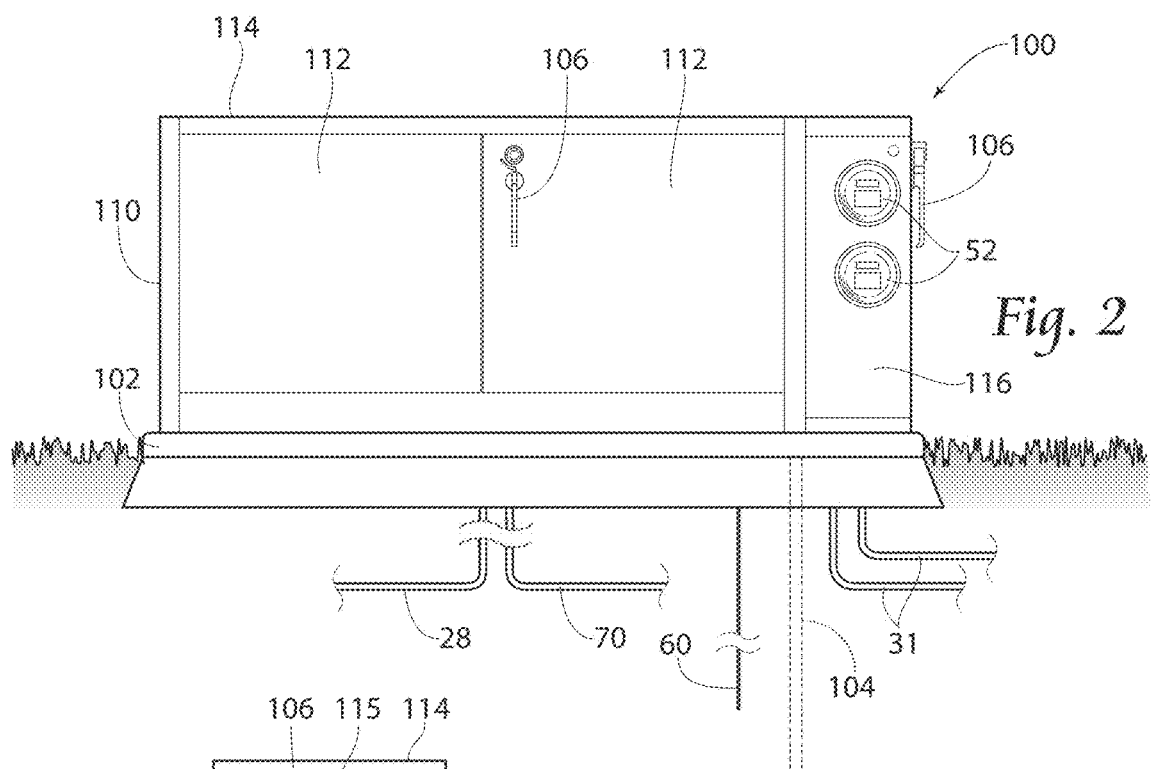
FIG. 2 is a front view of an integral transformer junction module of the present invention.

Referring now to FIG. 2, a front view of the present invention, power assembly 100 is shown. A ground sleeve 102 is placed at the ground surface and extends into the ground at various depths as a mounting base and cable entry/training. Beneath ground, ground rod 60 protects the system to dissipate static voltage and lightning to earth if necessary (ensures ground potential for equipment). Reducing the number of underground wires and above-ground compartments or devices, power assembly 100 receives power from incoming line or lines 70, this can be single phase, two phase or three phase lines coming in and any number going out. Normally in this configuration we have three cables in and three cables out 70 in and 28 out. The high voltage line lines 70 in and line 28 out to next site requiring high side power to carry power to applications downstream. One or a plurality of lines 31 are the two legs and neutral going to the load they will feed the panel or load (e.g., if going to a house panel one is the 120V to ground and the other 120V to ground leg to leg will be the 240V).

A ground sleeve divider 104 separates secondary meter cabinet 116 from primary cabinet compartment 110 cables underground to maintain voltage separation, within ground sleeve 102 as in the unit above ground for safety.

Figure 3:
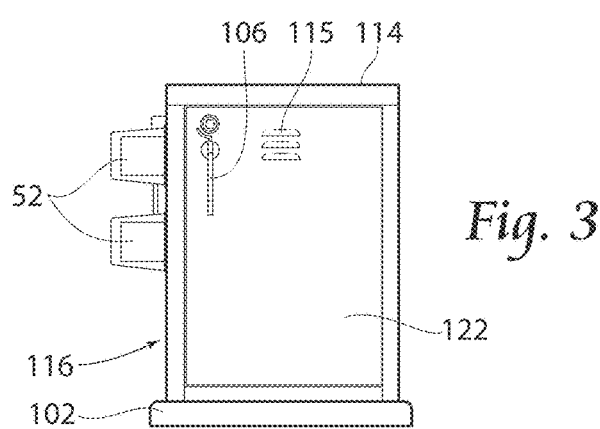
FIG. 3 is a side view of an integral transformer junction module of the present invention.

FIG. 3 is a side view of the embodiment shown in FIG. 2, i.e. a view of secondary cabinet and at times "secondary cabinet with meter" 116. Further illustrated are meters 52, ground sleeve 102, handle 106, hinged lid 114, vents or louvers 115, and side door 122.

Figure 4:
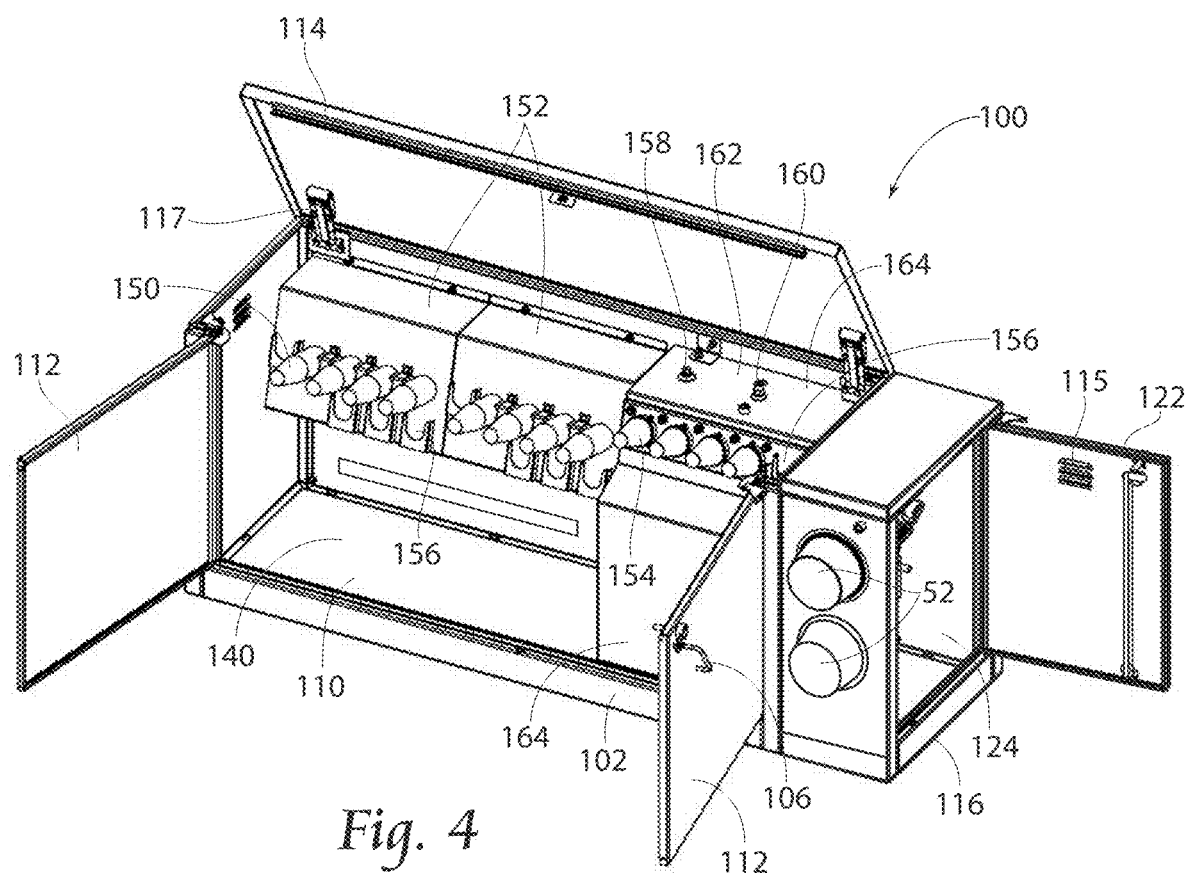
FIG. 4 is a perspective view of an integral transformer junction module of the present invention with compartments opened.

Referring now to FIG. 4, a perspective view of power assembly 100 is shown, with all access doors 112, 122 and hinged lid 114 open. Such a power assembly can be placed in an underground vault, or on a wall of a factory, or at ground surface on a ground sleeve or concrete pad, or other surface. Such a power assembly 100 can be made of a mild steel, aluminum, fiberglass (e.g., fiberglass non-metallic enclosure with a galvanized support frame) or stainless steel. Additionally, such a power assembly 100 can be wholly inside a cabinet or with separable secondary box connected by low voltage cables.

Compartmentalized ground sleeve 102 has a divider between the primary and secondary compartments 140/124 and also an additional divider if fiber is specified, and is used to physically separate wires between the primary and secondary compartments 140/124. One or more doors 112 are provided with a lockable handle and penta head bolt combination 106 for controlling access to the interior of sectionalizing cabinet compartments 110 and 124 aboveground. A hinged lid 114 provides further access to sectionalizing cabinet compartment 110, and an angled top surface of hinged lid 114 allows for snow and rain to run off the back of the cabinet.

Referring now to the secondary compartment 116, one or more meters 52 (optional) can be carried on the outside for meter reading, if desired. Meters 52 can also be arranged where desired, providing modularity for meters 52 on either the primary or secondary cabinets 140/124 and on a single phase transformer as an integral device. The power here can also be used to power a mesh network collector or other such meter collection or transmission location. In the secondary compartment 124 can optionally be placed a separate SCADA or fiber compartment on the opposite side of the low voltage compartment 116. The door 122 can also be configured to extend out to accommodate communication gear in the secondary compartment (not shown).

A lockable handle 106 is provided preferably on the side of secondary meter cabinet 116, and now referring to FIG. 3, on the side of secondary meter cabinet 116 are a door 122, and preferably air vents 115. Air vents or louvers 115 are also provided between the secondary/low voltage cabinet 124 and the primary/high voltage compartment 140, and also preferably from main compartment 140 to the outside environment, to promote air flow and heat dissipation.

In one embodiment, in an exemplary use with vaults, (Low voltage compartment) power assembly 100 is placed on top and low voltage cables are connected. The power assembly 100 can also be placed as a waterproof sealed unit that can be elevated when it is desired to add another load on to the secondary lugs.

In another embodiment, the secondary cabinet 124 is provided with a quick release detachment to the primary cabinet 140. For instance, clamps, bolts, or the like can be quickly removed and whole secondary cabinet (with the power section) can be removed and separated from the (primary cabinet), in order to remove the power section and the secondary cabinet, for quick change out.

Hinges 117 operate hinged lid 114. Within primary compartment or cabinet 140 are junction modules 150. Junction modules 150 are where the end of the cables (elbows) are attached and bring the power in. Shown is a 3 phase box with a single phase transformer tapped off of one of the phases, but other configurations are possible. Junction module positions 150 can be in various configurations and numbers of positions, commonly in 200 amp and 600 amp sizes.

A plurality of parking stations 156 are provided in proximity to junction module positions 150 and primary bushings 154. Positioned next to junction modules 152 is transformer assembly 162. Primary bushings 154 are carried by transformer (power assembly) assembly 162. Transformer tank 164 contains other portions of the transformer (not shown).

Integral to the transformer assembly 162 are an oil fill plug 158 and a pressure relief valve 160, known in the art. Another possible configuration is an offline tap changer integral to transformer assembly 162.

Within transformer assembly 162 is optionally a partial range current limiting fuse (not shown) and other low amp expulsion fuse options or other means of current interrupting on the high side, which is coordinated with the breaker 172 in the secondary cabinet 124 (FIG. 5) so the remote breaker handle 172 preferably opens the circuit prior to the primary fuse minimum melt point for overloads. Breaker 172 could also be a switched fuse, a fault interrupter, a circuit interrupter, a vacuum or SF6 switch, or other means of de-energizing the outgoing secondary lugs, so a fault going out is interrupted by the breaker or protective device to de-energize 172 the outgoing power protecting the system and people.

Still referring to FIG. 4, some of the illustrated embodiments are for placement on a three phase system where only a single phase load is required. However, if there are two large houses near an intersection or entrance to a cul-de-sac, it may be preferable to provide a unit with feeds on both sides to feed both loads. In this circumstance, a low voltage compartment on both sides of the unit with only one junction module in the middle and two power sections on each side is provided, (left and right).

Figure 5:
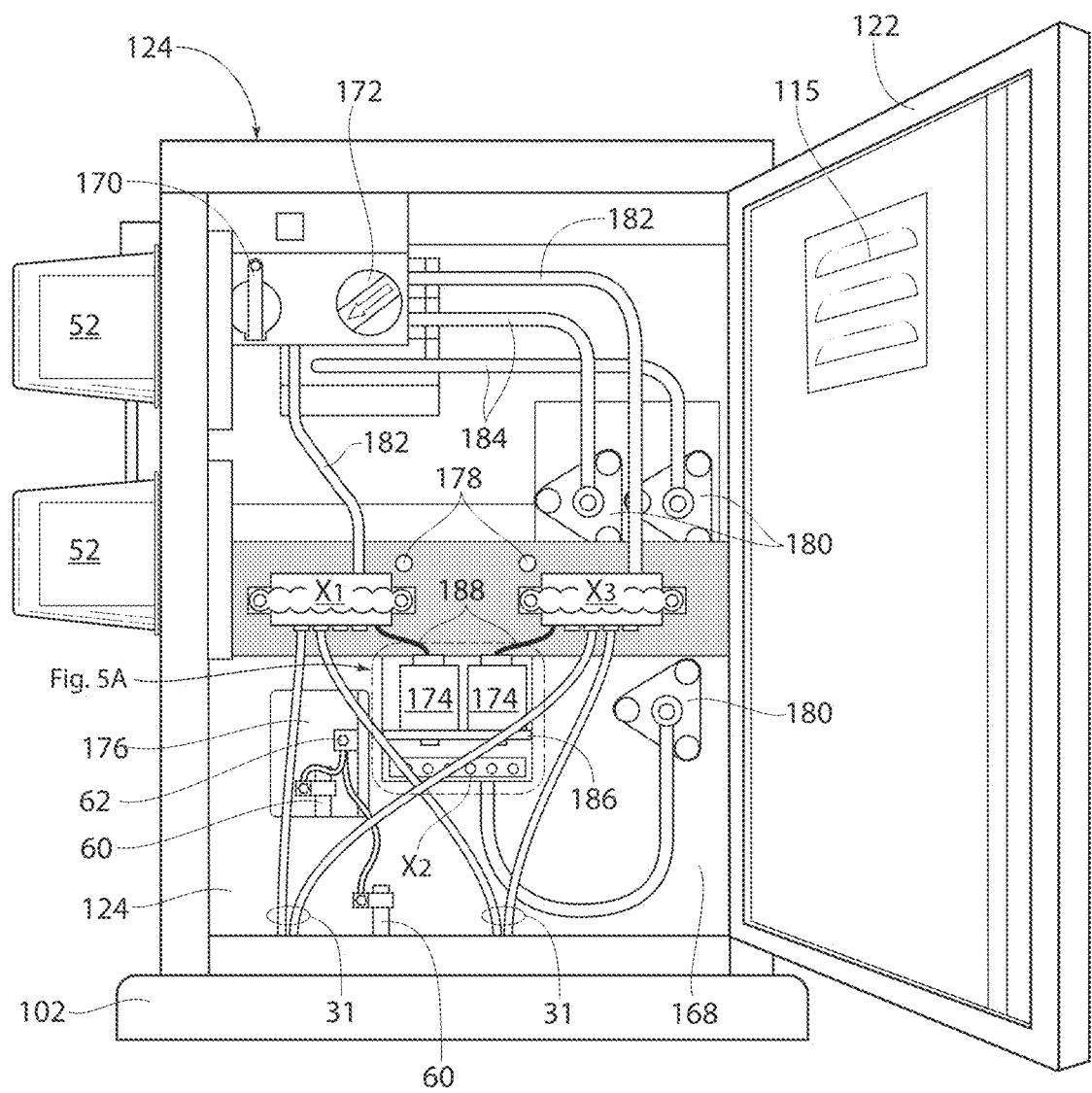
FIG. 5 is a side view of an integral transformer junction module of the present invention with an open secondary compartment.

Now referring to FIG. 5, secondary compartment 124 is shown. Secondary compartment 124 is advantageously arc-flash limiting. Dividing secondary compartment 124 and primary compartment 140 is divider wall 168. Divider wall 168 is preferably made of steel, aluminum or other material such as fiberglass or other A plate (shaded) carrying X1 and X3 is preferably a GPO3 material or other electrically insulated material. GPO3 is provided for strength and for electrical insulation between X1 and X3 or in a three phase unit X1, X2, X3 lugs/connection points. GPO3 is an electrical grade sheet laminate (for instance GPO3 pink insulating board). A window 176 (preferably polycarbonate resin thermoplastic, such as Lexan material) within wall 168 provides visual access to primary compartment 140 where a solid ground to ground connection 62 with ground rod 60 can be confirmed from the secondary compartment 124.

From the transformer assembly 162 in the primary compartment 140 (see FIG. 4), and through wall 168, power is delivered to the low voltage compartment via the low voltage bushings 180. Low voltage exits the primary compartment 140, and particularly transformer tank 164 via the low voltage bushings. Low voltage cables 184 carry power from the low voltage bushings 180 into a closed/open circuit breaker handle 172. Secondary compartment 124 can be provided with a flip up or removable cover if desired.

Low voltage bushings 180 preferably comprise offset bushings to allow for better access to ground leads against a metal backing plate, and secondary voltages are insulated (for instance by GPO3) and offset from back plate, ensuring voltage separation and ease of installation and operation. Low voltage bushings 180 can comprise stand-off bushings on studs to hold the breaker off the back plate to increase air flow/cooling.

Circuit breaker 172 opens the low voltage side of the unit, and de-energizes X3 and X1. In a preferred embodiment, a remote or extended handle for the breaker or switched fuse is provided (optionally a fault interrupter or other means of circuit interruption) so the secondary can be turned off and the voltage indicator lights 178 are turned off. Also in a preferred embodiment, interior lights for the compartment will stay on while the door is open.

From the circuit breaker 172, power is carried to X1 and X3 connectors by cables 182. X2 is a neutral bushing for transformer windings from the power section 164 (FIG. 4), through low voltage bushing 180, which provides the electrical reference to the windings. Bushings 180 can be bushings with cables connected as shown, one-piece bushings with wire leads, or a bus or any other means of getting low voltage power out of the transformer to another means of distributing the power to the load/customer.

A high impedance test point 170 is provided as one form of confirmation of a live power system. High impedance test point 170 is used to test the circuit to make sure the low voltage lugs are de-energized prior to handling or working in the cabinet or moving closer to the secondary cabinet internals. Additionally for the purpose of demonstrating live power, LED lights (or other means of illumination) 178 are provided. Compartmental LED lights (not shown) are provided to illuminate the work space in the secondary compartment, preferably placed behind high impedance test point 170 and circuit breaker remote handle 172, and these compartmental LED lights also illuminate the ground connection 60 in the primary compartment 140. These compartmental LED lights are preferably magnet switch activated protected by current limiting fusing and serve to light up the compartment when someone is working, because lights 178 are intended to indicate power at X1 or X3. Additional lights may be provided for illumination purposes, for instance hung from top surfaces of the primary cabinet. In a preferred embodiment, LED lights 178 switch on when a cabinet door is opened (magnetic switch) so the operator can see the system is live, for instance two red lights proximal to X3 and X1. These lights show that there is power to X1 and X3. The unit can be live but when X1 and X3 are de-energized the lights will go off, and this feature helps confirm no power at X1 and X3 and that there is no back feed from the customer as well. With today's prevalence of house backup generators and solar panels this also provides a means of ensuring no back feed into the unit prior to connecting grounding equipment lugs prior to working on them.

In an alternative embodiment (not shown), secondary cabinet 124 is touch safe with no exposed buss work or wires that can be touched while the unit is energized. A user is able to confirm with a light and high impedance test point 170 that the secondary lugs are de-energized.

LED lights 178 light up the secondary lugs if the door 122 is open to show that there is power at the secondary connectors X1 and X3. Once you open the breaker 172 or fused switch or other interrupting device the lights 178 turn off, and no power is confirmed at the high impedance test points 170 allow a second way of ensuring no power at this point.

In an alternate, preferred embodiment, X1 and X3 connectors can be used as shown in FIG. 5B. An insulated (touch safe) low voltage connector X1 or X3 is equipped with a ground stud 198 which has a removable insulation cap (not shown). In a preferred embodiment, X1 and X3 are insulated multi-tap connectors with double-sided entry, and can contain a variable number of ports. When working in the low voltage side a user de-energizes the unit and when no power is confirmed by: i) LED lights off; and ii) no voltage at the high impedance test points, a user can remove the insulated cap and ground to ground stud 198 with ground leads to prevent backfire and provide a safe path to ground in case the unit would get energized. A ground probe can be provided coming out of the secondary lugs that is preferably insulated. When the unit is de-energized a grounding cable can be attached to the low voltage lugs provide two means of confirming no power and a way of ensuring the unit is grounded properly and safer from back feeds or accidental unit energization. On the left and right are provided rubber insulated mounting ports 196 to support X1, X3 without touching ground.

In an alternative embodiment, an internal/secondary swing open and latched door with a preferably polycarbonate resin thermoplastic window are provided for viewing test point 170. This adds another layer of protection to operators and protects them from arc flash.

Figure 5A:
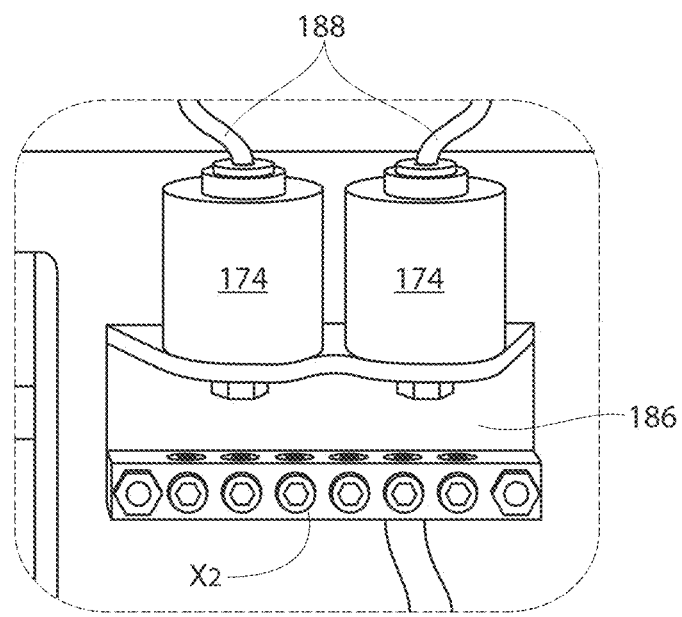
FIG. 5A is a close up view taken from FIG. 5.

Turning to FIGS. 5 and 5A, arresters 174, preferably 140 ka arresters are used to arrest/ground for instance lightning strikes. Arresters 174 are carried by grounded angle aluminum 186 which carries ground lugs 188, which allows for a minimum amount of lead length, which improves protection. In a preferred embodiment arresters 174 share a ground with X2bushing, and a ground angle aluminum plate for grounding the arresters 174 preferably has an integral X2ground lug attached.

The X1 and X3 low voltage lugs are connected to the top of the arresters (leads) 188 by any means of connection (wire, metal link, etc).

In an optional embodiment, bottoms of arresters 174 may have a conductive material between it and the angle 186 to reduce resistance to ground and provide a means of reducing lead length and mounting the arresters. A conductive paste/substance may be used between the bottom of the arrester and the bracket to reduce oxidation and increase conductivity, while also increasing surface area.

In one embodiment, additional LED lights to light up the secondary compartment 124 are provided by a magnet switch (not shown) on the door 112 to turn the lights on when the door 112 is open. The magnet switch can complete the circuit to the cabinet compartment lights and also complete the circuit for the X1 and X3 LEDs such that power is indicated when the door 112 is open.

Additional options include a fiber patch or box and Wi-Fi capabilities.

Figure 6:
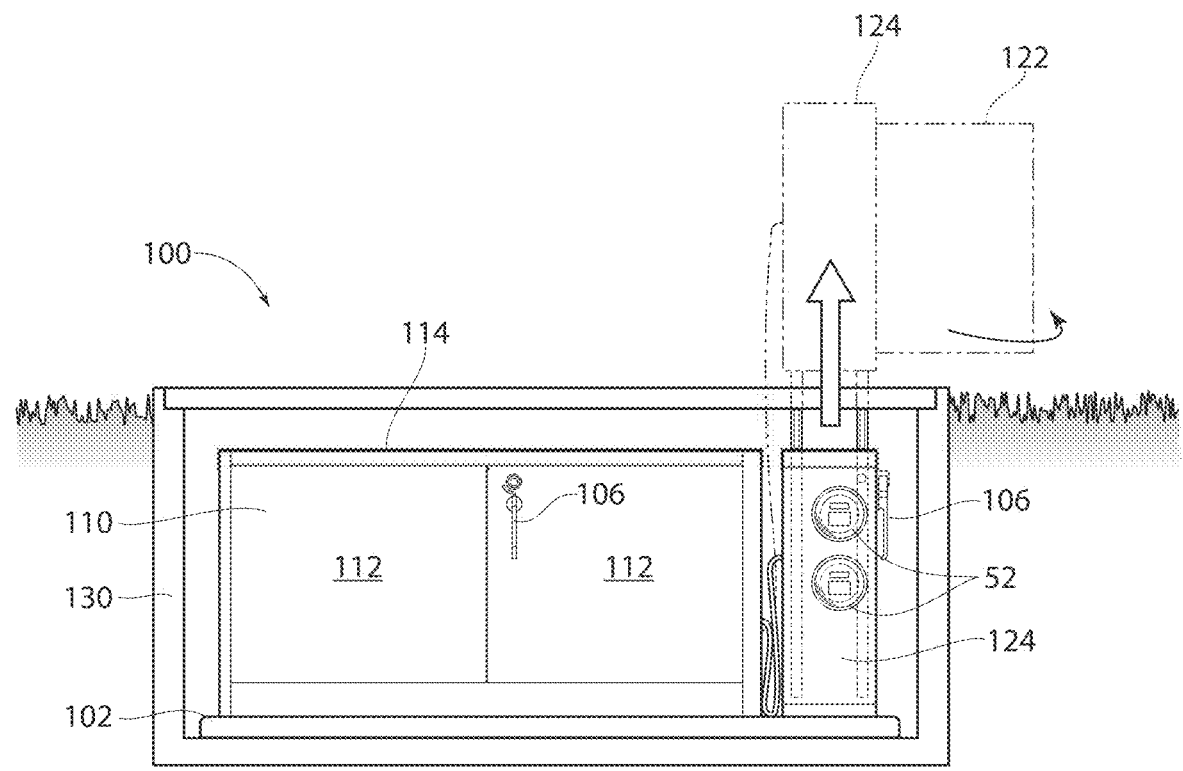
FIG. 6 is a perspective view of an alternative embodiment of a transformer junction module of the present invention with the unit in a vault.

Referring now to FIG. 6, a view of an alternative embodiment of a transformer junction module of the present invention is shown. An underground vault 130 carries sectionalizing cabinet 110. As can be seen, in this embodiment, secondary compartment 124 is removable from sectionalizing cabinet 110 for the line worker to access the interior via door 122. In one embodiment, the unit will not have doors on the primary since it is locked up in a vault already.

Figure 7:
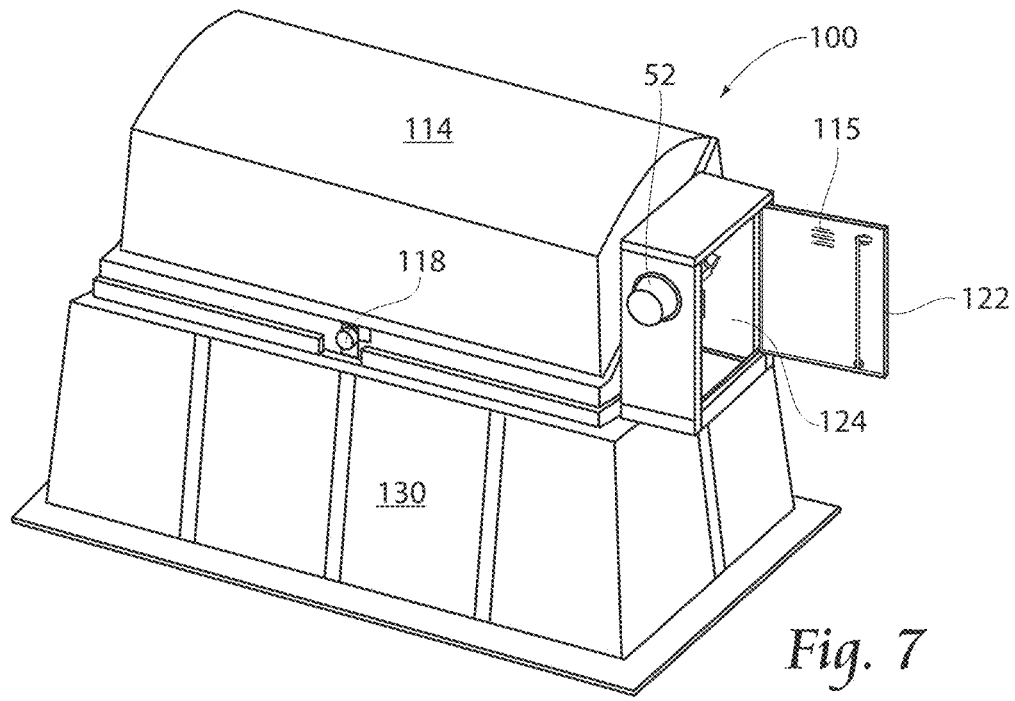
FIG. 7 is a perspective view of an alternative embodiment of a transformer junction module of the present invention with a preferably fiberglass enclosure.
Figure 8:
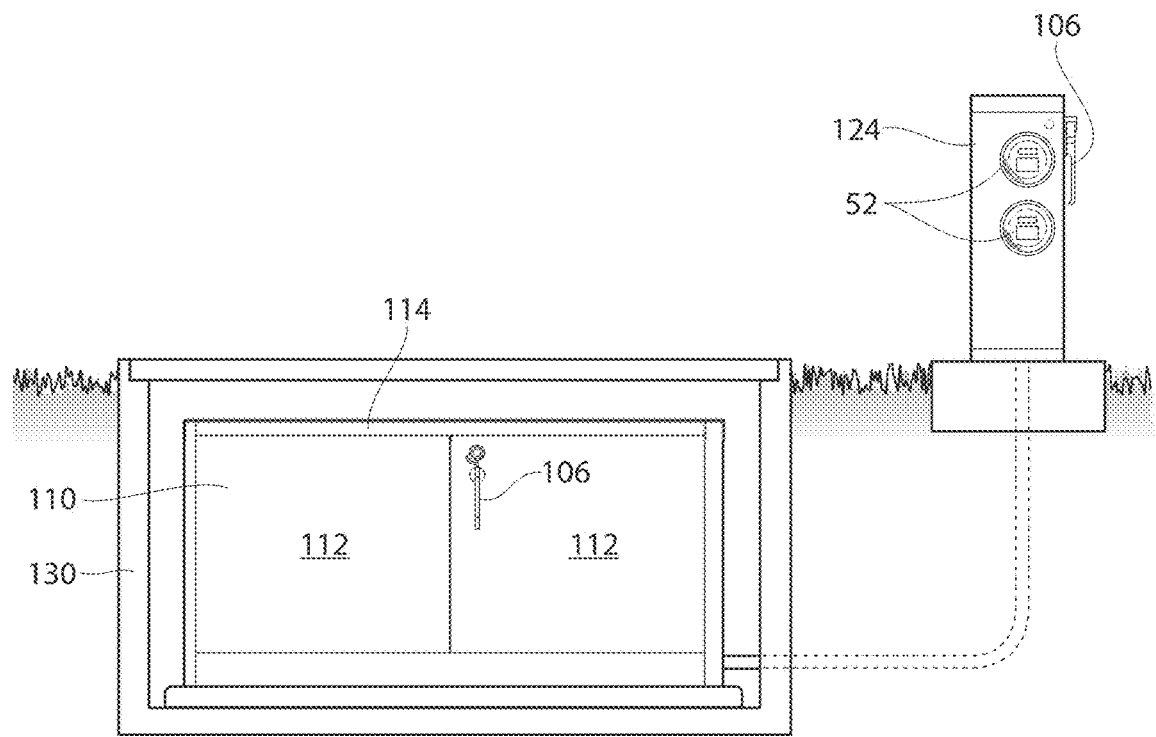
FIG. 8 is a front view of an alternative embodiment of a transformer junction module in an underground vault of the present invention with an above ground secondary compartment with meter option.
Figure 15:
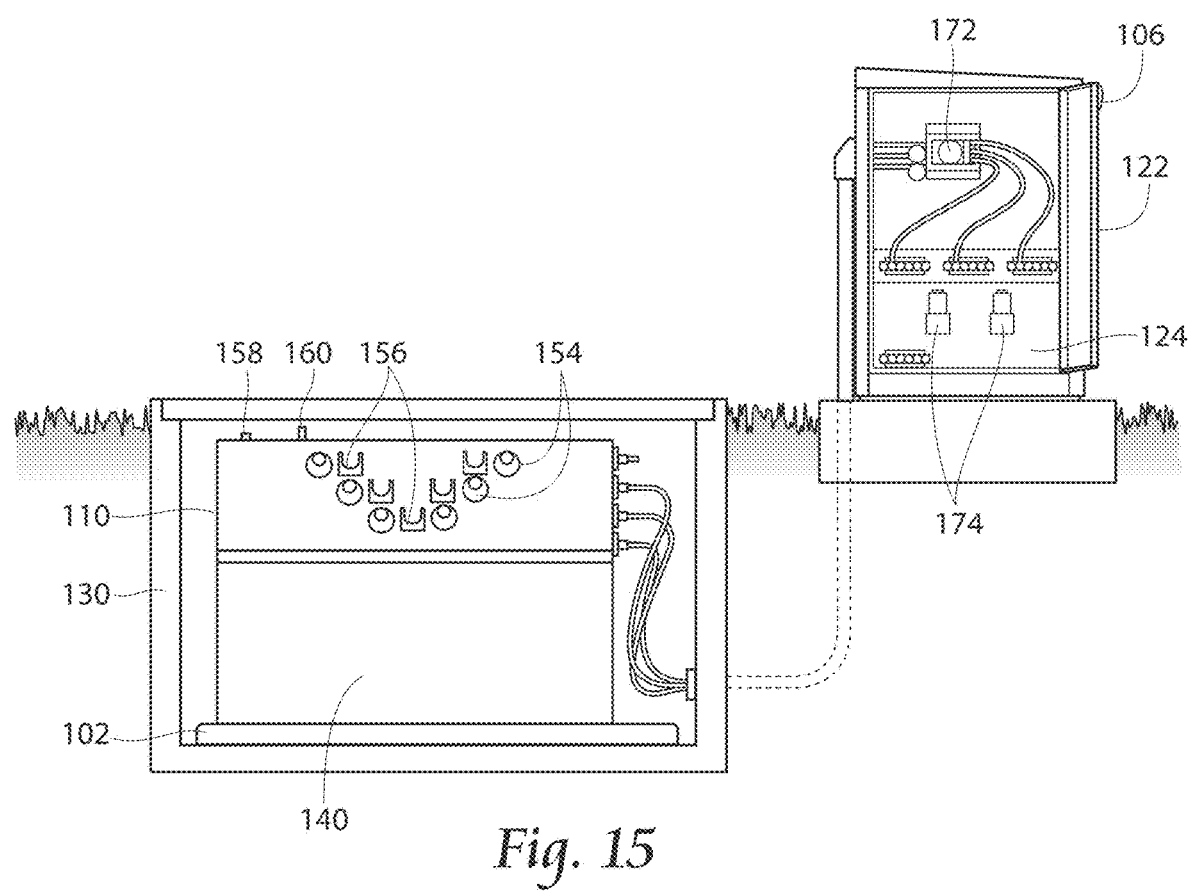
FIG. 15 is a front view of another embodiment of the invention.

FIG. 7 shows an above-ground unit 114, which could be made of fiberglass. (FIGS. 6, 8 and 15 show an underground vault 130.) As can be seen, in this embodiment a different closure style for lid 114 is a possibility, including a locking latch 118.

In addition to an underground vault 130 containing sectionalizing cabinet 110, FIG. 8 shows a secondary compartment 124 separately placed above ground. This permits secondary cabinet 124 to be further separated from the sectionalizing cabinet 110 where the dielectric fluid is present. This further reduces threat of arc flash. Recessed bushings also allow for better spacing/geometry in a tight space. It is also optional to have heat tubes (not shown) in the sectionalizing cabinet 110 to remove heat from the dielectric fluids and increase heat transfer.

Various arrangements designed for specific location needs are envisioned in this invention. Some of these are shown in FIGS. 9-15. Sizes (kVA) will vary, as will cabinet sizes, depending on the application. For instance, FIGS. 9-15 refer generally to more industrial or "main feeder" applications closer to the substation and where better sectionalizing is required. In those configurations, the larger switches have protected taps that have large interrupters that will isolate circuits with 200 to for instance 600 Amps of power. Embodiments such as taught in U.S. Pat. No. 7,548,148 are better suited to cover smaller areas or rural areas that should not be affected by an outage. Switchgear is used where there is a large or dense load or is closer in to the substation so if power is lost the circuit can be opened to prevent other feeders out of the substation to be adversely effected.

Figure 9:
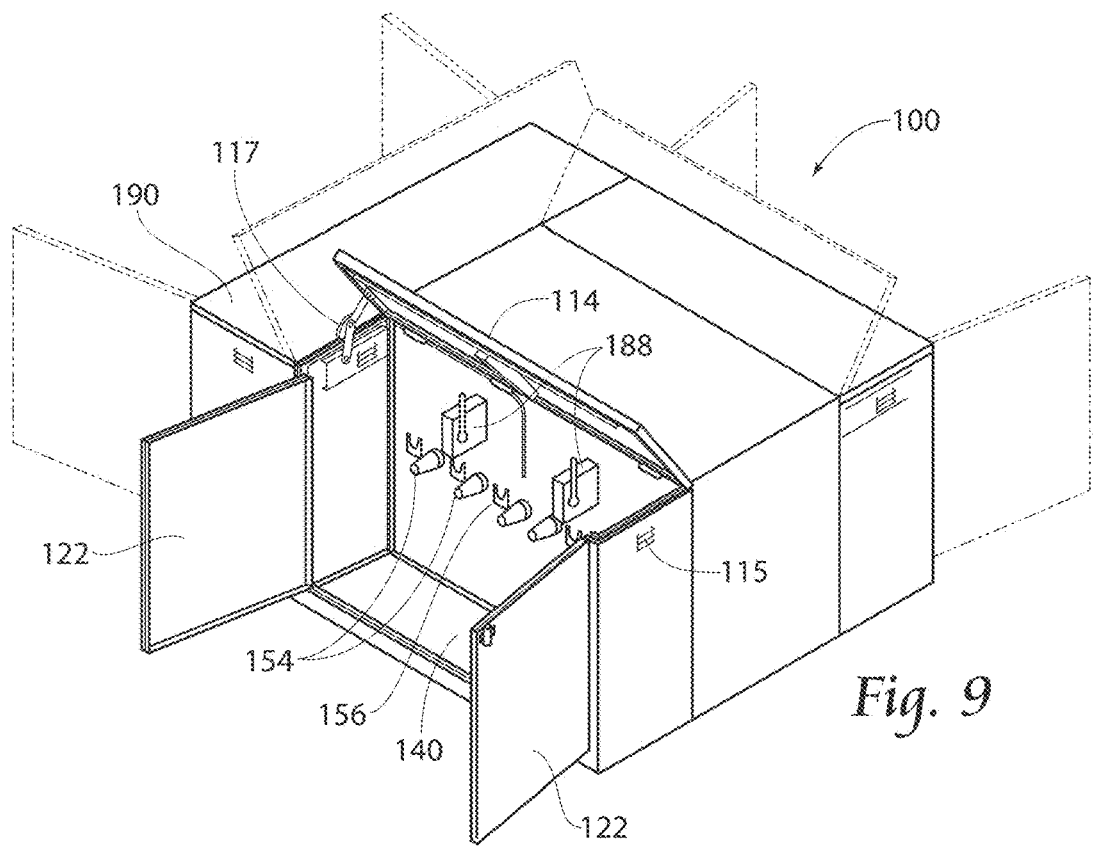
FIG. 9 is a perspective view of an alternative embodiment of a transformer junction module (switchgear with transformer/secondary cabinet) of the present invention.

Referring specifically to FIG. 9, a padmount switch, an alternative embodiment of a transformer junction module (switchgear with transformer/secondary cabinet) is illustrated. The padmount switch has a high voltage switch and in a preferred embodiment a fuse or interrupter for high voltage circuits.

Transformer compartment 190 is shown to the rear, and switch handles 188 are provided. This switchgear is often insulated on the high voltage side by air, mineral oil or esther fluid, SF6 gas, encapsulated with a polymer type material and interruption is made in a vacuum, air or SF6 "PUFFERS". This arrangement adapts the power section and low voltage compartment to a switch as opposed to a sectionalizing or junction cabinet. This combination will often include a separate compartment for a 1, 2 or three phase power section and a low voltage section separating high and low voltage. Connecting the switchgear and power section i.e. bringing power into the power section can be by cables/elbows or a high voltage bushing or other means.

For corners/intersections, batteries and a charger (not shown) may be installed in the compartment to provide temporary backup power for low voltage circuits. This is particularly useful at intersections for street lights, where power outages can cause traffic problems for applications with switchgear or sectionalizing box.

In this way, it is possible to provide a three phase transformer and to distribute the load from, for instance, junctions in primary, by dimensions and providing a low profile three phase transformer with a separate secondary compartment.

Figure 10:
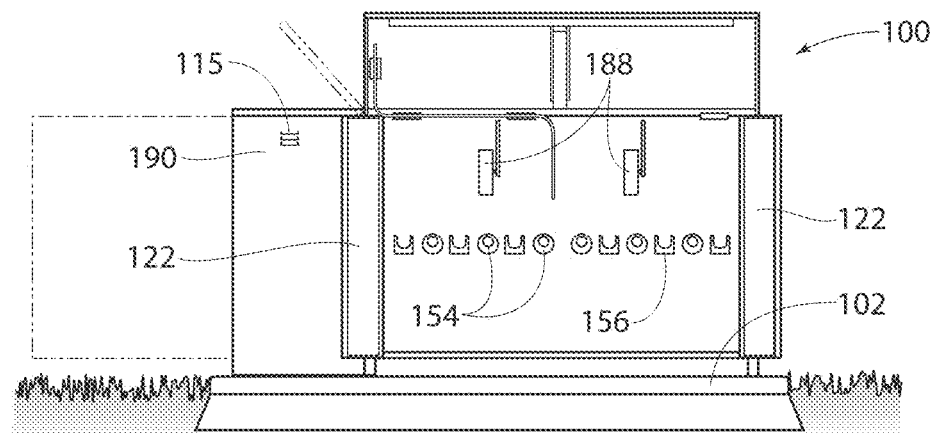
FIG. 10 is a front view of the embodiment shown in FIG. 9.
Figure 11:
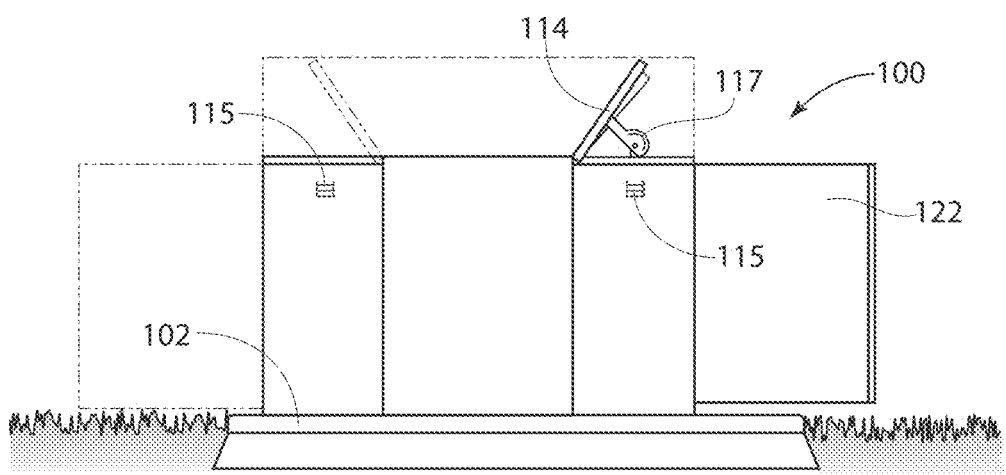
FIG. 11 is a side view of the embodiment shown in FIG. 9.

Referring to FIGS. 9-11, a primary compartment 140 can be a junction/sectionalizing unit or a switchgear unit, typically used at intersections or tap off points on a power system. A switchgear is preferred on larger circuits in cities that need to protect the larger cables and loads, whereas the sectionalizing boxes are most often used in rural areas or lightly loaded areas where cost is an issue. Switch handles 188 are shown, which switches all three phases at once. In certain embodiments, switch handles 188 are for each individual phase so at times there may be three handles.

At transformers located near intersections for example, an optional battery backup can be provided so that power can be backed up until distribution power can be restored or the transformer changed out. Repeaters for automatic metering can also be added. Telecommunications such as internet or radio can also be added.

Figure 12:
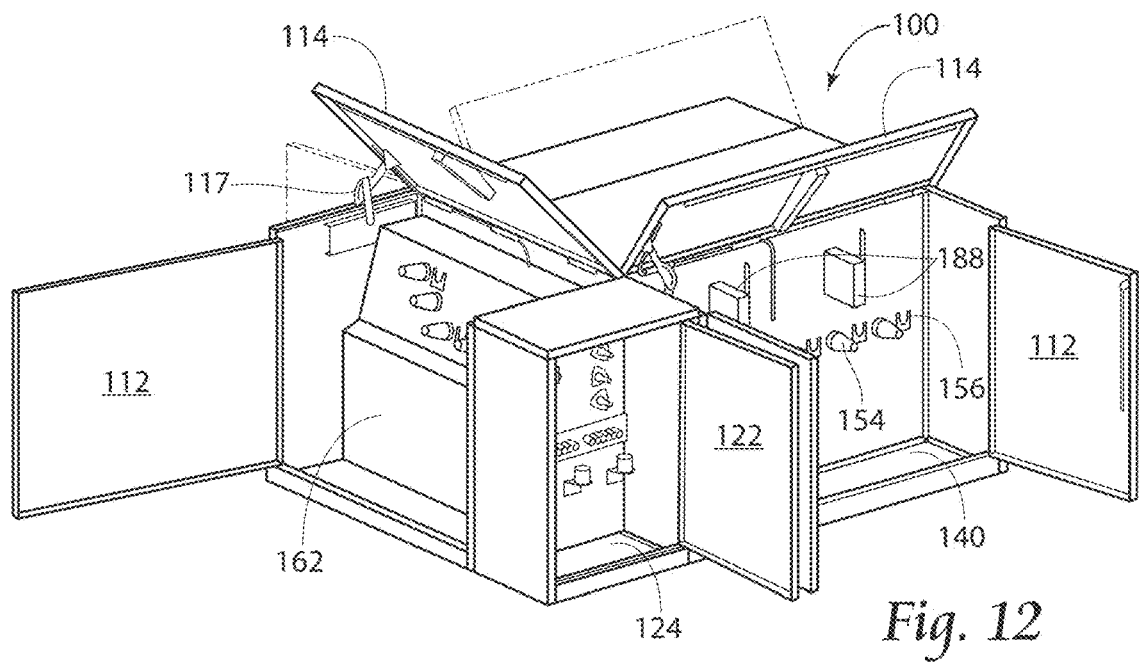
FIG. 12 is a perspective view of an alternative embodiment of a padmount switchgear with an integral transformer and an integral secondary compartment of the present invention.
Figure 13:
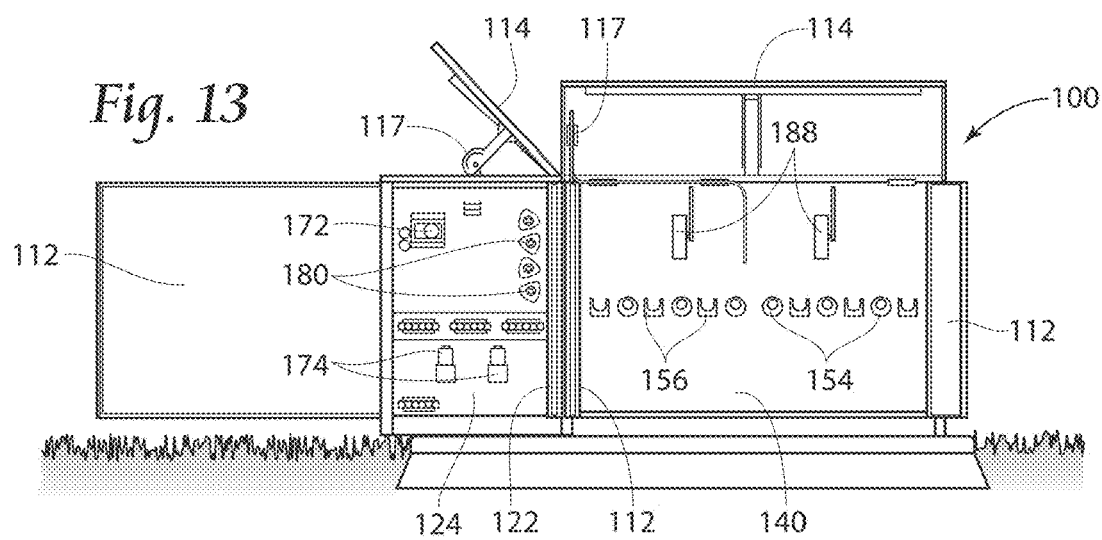
FIG. 13 is a front view of the embodiment shown in FIG. 12 which shows the switchgear front plate and secondary compartment.
Figure 14:
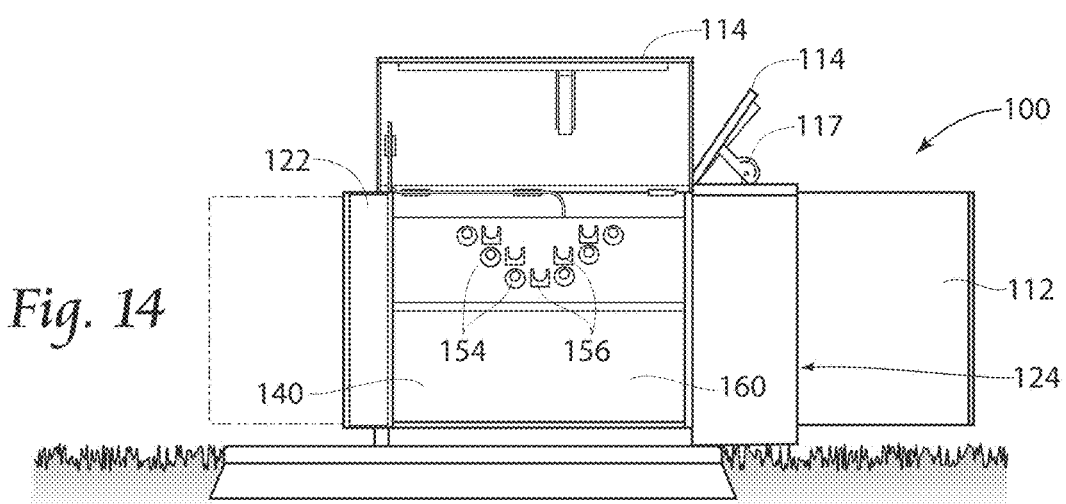
FIG. 14 is a side view of the embodiment shown in FIG. 12 which shows the front of the transformer primary compartment.

Referring now to FIGS. 12-14, a top perspective, front and side views of an alternate embodiment are shown. In this embodiment, transformer 162 is housed in a separate primary compartment from high voltage switch compartment primary compartment 140 and secondary compartment 124.

Referring now to FIG. 15, an additional alternate embodiment is shown. In this embodiment, underground vault 130 carries primary compartment 140 and switch compartment, and secondary compartment 124 is carried aboveground on a pad.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

The invention claimed is:

1. A power assembly module comprising:
a low voltage compartment and a high voltage compartment positioned within said module;
said low voltage compartment is segregated from said high voltage compartment by a barrier sized and configured to restrain simultaneous operator exposure to said low voltage compartment and said high voltage compartment;
said power assembly module positioned on an electrical distribution system at a junction point between a substation and a load.

2. A power assembly module according to claim 1, said power assembly module further comprising a low voltage bushing coupling said high voltage compartment to said low voltage compartment.

3. A power assembly module according to claim 2, said low voltage bushing coupled extending through said barrier.

4. A power assembly module according to claim 2, said low voltage bushing coupled to a transformer carried within said high voltage compartment.

5. A power assembly module according to claim 1, said power assembly module further comprising a low voltage bushing electrically coupling said high voltage compartment to said low voltage compartment.

6. A power assembly module according to claim 1, said barrier comprising a viewing window providing a line of sight between said low voltage compartment and a ground connection within said high voltage compartment.

7. The power assembly of claim 1, further comprising an interrupting device positioned between said a low voltage bushing and a low voltage connector.

8. The power assembly of claim 7 further comprising a lightning arrestor coupled to at least one of said low voltage connector and ground.

9. The power assembly of claim 8 wherein said lightning arrestor is carried by a tank of a transformer positioned within said high voltage compartment.

10. The power assembly of claim 7, said interrupting device comprising at least one of a fuse, and a circuit breaker or other current interrupting device.

11. The power assembly of claim 1, wherein said low voltage compartment and said high voltage compartment are provided in a single unit cabinet.

12. The power assembly of claim 1, wherein said low voltage compartment and said high voltage compartment are provided in a single unit cabinet contained inside a vault.

13. The power assembly of claim 1, wherein said low voltage compartment is movably coupled to said high voltage compartment.

14. The power assembly of claim 1, said assembly further comprising a powered junction unit supplying a battery backup to a low voltage load.

15. The power assembly of claim 1, said assembly further comprising an indicator of voltage at said low voltage connector.

16. The power assembly of claim 1, said assembly further comprising a source of light responsive to a door open or a door closed condition of a door to said low voltage compartment.

17. The power assembly of claim 1, said assembly further comprising a supervisory control and data acquisition component.

18. The power assembly of claim 1, said assembly further comprising a battery backup system carried by said module.

19. A power assembly module comprising:
a low voltage compartment and a high voltage compartment positioned within said module;
said low voltage compartment is segregated from said high voltage compartment by a barrier sized and configured to restrain simultaneous operator exposure to said low voltage compartment and said high voltage compartment;
an interrupting device positioned between a low voltage bushing and a low voltage connector; a lightning arrestor coupled to said low voltage connector and ground; and
wherein said lightning arrestor is carried by a grounded L-bracket.

20. A power assembly module comprising:
a low voltage compartment and a high voltage compartment positioned within said module;
said low voltage compartment is segregated from said high voltage compartment by a barrier sized and configured to restrain simultaneous operator exposure to said low voltage compartment and said high voltage compartment;
the assembly further comprising a ground sleeve coupled to said low voltage compartment and said high voltage compartment, said ground sleeve comprising a ground sleeve divider separating a high voltage portion of said ground sleeve and a low voltage portion of said ground sleeve.

21. A power assembly module comprising:
a low voltage compartment and a high voltage compartment positioned within said module;
said low voltage compartment is segregated from said high voltage compartment by a barrier sized and configured to restrain simultaneous operator exposure to said low voltage compartment and said high voltage compartment;
said assembly further comprising a secondary ground stud carried by said low voltage connector, said secondary ground stud carrying an insulated cover.

22. A power assembly module comprising:
a low voltage compartment and a high voltage compartment positioned within said module;
said low voltage compartment is segregated from said high voltage compartment by a barrier sized and configured to restrain simultaneous operator exposure to said low voltage compartment and said high voltage compartment;
a source of illumination indicative of voltage in said low voltage compartment carried by said power assembly module;
a high impedance test point indicative of voltage in said low voltage compartment carried by said power assembly module.

\* \* \* \* \*